US009436864B2

(12) United States Patent
Gozzini

(10) Patent No.: US 9,436,864 B2
(45) Date of Patent: Sep. 6, 2016

(54) ELECTRONIC DEVICE PERFORMING FINGER BIOMETRIC PRE-MATCHING AND RELATED METHODS

(75) Inventor: Giovanni Gozzini, Berkeley, CA (US)

(73) Assignee: APPLE INC., Cupertino, CA (US)

( * ) Notice: Subject to any disclaimer, the term of this patent is extended or adjusted under 35 U.S.C. 154(b) by 442 days.

(21) Appl. No.: 13/592,616

(22) Filed: Aug. 23, 2012

(65) Prior Publication Data

US 2014/0056493 A1   Feb. 27, 2014

(51) Int. Cl.
*G06K 9/00* (2006.01)

(52) U.S. Cl.
CPC ......... *G06K 9/00087* (2013.01); *G06K 9/0012* (2013.01)

(58) Field of Classification Search
None
See application file for complete search history.

(56) References Cited

U.S. PATENT DOCUMENTS

| 5,067,162 | A | * | 11/1991 | Driscoll, Jr. | ....... G06K 9/00067 |
| | | | | | 382/126 |
| 5,572,597 | A | * | 11/1996 | Chang | ................... G06K 9/0008 |
| | | | | | 382/125 |
| 5,940,526 | A | | 8/1999 | Setlak et al. | |
| 5,953,441 | A | | 9/1999 | Setlak | |
| 5,974,163 | A | * | 10/1999 | Kamei | ................. A61B 5/1172 |
| | | | | | 382/125 |
| 6,134,340 | A | * | 10/2000 | Hsu | ....................... G06K 9/6203 |
| | | | | | 382/124 |
| 6,289,114 | B1 | | 9/2001 | Mainguet | |
| 6,393,139 | B1 | * | 5/2002 | Lin | ........................ G06F 21/316 |
| | | | | | 382/124 |
| 6,546,122 | B1 | * | 4/2003 | Russo | ................ G06K 9/00026 |
| | | | | | 382/125 |
| 6,927,581 | B2 | | 8/2005 | Gozzini | |
| 6,961,452 | B2 | * | 11/2005 | Fujii | ..................... G06K 9/6255 |
| | | | | | 382/125 |
| 7,046,829 | B2 | * | 5/2006 | Udupa | ............... G06K 9/00087 |
| | | | | | 340/5.53 |
| 7,079,670 | B2 | * | 7/2006 | Pan | ..................... G06K 9/00087 |
| | | | | | 235/380 |
| 7,142,699 | B2 | * | 11/2006 | Reisman | ............ G06K 9/00087 |
| | | | | | 283/69 |
| 7,187,786 | B2 | * | 3/2007 | Kee | ..................... G07C 9/00158 |
| | | | | | 382/118 |
| 7,236,617 | B1 | * | 6/2007 | Yau | ..................... G06K 9/00026 |
| | | | | | 382/125 |

(Continued)

*Primary Examiner* — Chan Park
*Assistant Examiner* — Iman K Kholdebarin
(74) *Attorney, Agent, or Firm* — Allen, Dyer, Doppelt, Milbrath & Gilchrist, P.A.

(57) ABSTRACT

An electronic device may include a finger biometric sensor to sense a user's finger adjacent thereto, and a memory for storing finger matching biometric data and a subset of finger matching biometric data. The electronic device may include a processor coupled to the finger biometric sensor to acquire finger matching biometric data from the finger biometric sensor, and perform a finger pre-matching between a subset of the acquired finger matching biometric data and the subset of stored finger matching biometric data and based upon context data to generate pre-match data. The processor may also perform a finger matching between the acquired finger biometric data and the stored finger matching biometric data based upon the pre-match data.

17 Claims, 6 Drawing Sheets

(56) References Cited

U.S. PATENT DOCUMENTS

| | | | |
|---|---|---|---|
| 7,327,859 B1* | 2/2008 | Chau | G06K 9/00046 |
| | | | 382/116 |
| 7,333,637 B2* | 2/2008 | Walfridsson | G06K 9/00087 |
| | | | 235/382 |
| 7,361,919 B2 | 4/2008 | Setlak | |
| 7,406,601 B2* | 7/2008 | Hamid | G06K 9/00006 |
| | | | 713/186 |
| 7,697,281 B2 | 4/2010 | Dabov et al. | |
| 7,697,729 B2 | 4/2010 | Howell et al. | |
| 7,715,593 B1 | 5/2010 | Adams et al. | |
| 7,734,068 B2 | 6/2010 | Fisher | |
| 7,778,449 B2* | 8/2010 | Shinzaki | G06K 9/0008 |
| | | | 382/124 |
| 8,051,476 B2* | 11/2011 | McArdle | 726/17 |
| 8,145,916 B2 | 3/2012 | Boshra et al. | |
| 8,171,304 B2* | 5/2012 | Hillhouse | G06K 9/00087 |
| | | | 382/124 |
| 8,180,120 B2 | 5/2012 | Hook | |
| 8,276,816 B2* | 10/2012 | Gardner | G06K 9/00026 |
| | | | 235/380 |
| 8,300,904 B2* | 10/2012 | Chen | G06K 9/00093 |
| | | | 382/115 |
| 8,406,478 B2* | 3/2013 | Chen | G06F 21/32 |
| | | | 340/5.52 |
| 8,432,368 B2* | 4/2013 | Momeyer | G06F 1/1684 |
| | | | 345/156 |
| 2003/0123715 A1* | 7/2003 | Uchida | G06K 9/00026 |
| | | | 382/124 |
| 2003/0212709 A1* | 11/2003 | De Schrijver | G06F 21/32 |
| 2004/0139329 A1* | 7/2004 | Abdallah | H04L 9/3231 |
| | | | 713/182 |
| 2004/0215615 A1* | 10/2004 | Larsson | G06K 9/00013 |
| 2004/0230810 A1* | 11/2004 | Hillhouse | 713/186 |
| 2005/0117785 A1* | 6/2005 | Boshra | G06K 9/00087 |
| | | | 382/124 |
| 2006/0104484 A1* | 5/2006 | Bolle | G06K 9/00885 |
| | | | 382/115 |
| 2006/0120568 A1* | 6/2006 | McConville | G07C 9/00111 |
| | | | 382/115 |
| 2007/0014443 A1* | 1/2007 | Russo | G06K 9/00906 |
| | | | 382/124 |
| 2007/0047785 A1* | 3/2007 | Jang | G06K 9/0008 |
| | | | 382/125 |
| 2007/0248249 A1* | 10/2007 | Stoianov | G06K 9/00087 |
| | | | 382/124 |
| 2008/0052522 A1* | 2/2008 | McArdle | 713/182 |
| 2008/0123908 A1* | 5/2008 | Waldman | G06K 9/00046 |
| | | | 382/124 |
| 2008/0219522 A1 | 9/2008 | Hook | |
| 2008/0225846 A1* | 9/2008 | Kanevsky | H04L 63/0861 |
| | | | 370/389 |
| 2008/0240523 A1* | 10/2008 | Benkley | G06K 9/00026 |
| | | | 382/126 |
| 2008/0298649 A1* | 12/2008 | Ennis | G06K 9/00046 |
| | | | 382/125 |
| 2009/0060296 A1* | 3/2009 | Mainguet | G06K 9/0012 |
| | | | 382/124 |
| 2009/0083850 A1 | 3/2009 | Fadell et al. | |
| 2009/0316963 A1 | 12/2009 | Boshra | |
| 2009/0324026 A1* | 12/2009 | Kletter | G06K 9/00442 |
| | | | 382/124 |
| 2010/0082444 A1 | 4/2010 | Lin et al. | |
| 2010/0321158 A1 | 12/2010 | Setlak et al. | |
| 2011/0175703 A1 | 7/2011 | Benkley, III | |
| 2012/0085822 A1* | 4/2012 | Setlak | G06K 9/605 |
| | | | 235/439 |
| 2012/0127069 A1* | 5/2012 | Santhiveeran et al. | 345/156 |
| 2012/0195475 A1* | 8/2012 | Abiko | G06T 7/00 |
| | | | 382/124 |
| 2012/0321149 A1* | 12/2012 | Carver | G06K 9/0004 |
| | | | 382/124 |
| 2014/0003678 A1* | 1/2014 | Vieta | G06K 9/00026 |
| | | | 382/124 |
| 2014/0026208 A1* | 1/2014 | Coons | G06K 9/00107 |
| | | | 726/16 |
| 2014/0059065 A1* | 2/2014 | Cortes et al. | 707/758 |
| 2014/0140586 A1* | 5/2014 | Case | G06K 9/00013 |
| | | | 382/124 |
| 2014/0236988 A1* | 8/2014 | Harron | G06F 17/30784 |
| | | | 707/769 |
| 2015/0186706 A1* | 7/2015 | Pierce | G06K 9/00067 |
| | | | 382/124 |

* cited by examiner

ELECTRONIC DEVICE PERFORMING FINGER BIOMETRIC PRE-MATCHING AND RELATED METHODS

FIELD OF THE INVENTION

The present invention relates to the field of electronics, and, more particularly, to the field of finger sensors.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,953,441 to Setlak and assigned to the assignee of the present invention, the entire contents of which are herein incorporated by reference. The fingerprint sensor is an integrated circuit sensor that drives the user's finger with an electric field signal and senses the electric field with an array of electric field sensing pixels on the integrated circuit substrate.

U.S. Pat. No. 6,289,114 to Mainguet, which is assigned to the assignee of the present invention and is incorporated in its entirety by reference discloses a fingerprint sensor that includes a finger sensing integrated circuit (IC). The finger sensing IC includes a layer of piezoelectric or pyroelectric material placed between upper and lower electrodes to provide electric signals representative of an image of the ridges and valleys of the fingerprint.

A particularly advantageous approach to multi-biometric fingerprint sensing is disclosed in U.S. Pat. No. 7,361,919 to Setlak, which is assigned to the assignee of the present invention and is incorporated in its entirety by reference. The Setlak patent discloses a multi-biometric finger sensor sensing different biometric characteristics of a user's finger that have different matching selectivities.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger. For example, the AES3400 sensor from AuthenTec, Inc. of Melbourne, Fla., is widely used in a variety of notebooks, desktops and PC peripherals. Other fingerprint sensors, for example, the AES850, also from AuthenTec, Inc. of Melbourne, Fla., is a sensor used on smartphones.

Where a fingerprint sensor is integrated into an electronic device or host device, for example, as noted above, it may be desirable to more quickly perform authentication, particularly while performing another task or an application on the electronic device. In other words, it may be particularly undesirable to have a user wait while a fingerprint is processed for authentication. Performing a fingerprint authentication with a reduced user delay and while maintaining a desired level of security may be increasingly difficult when a fingerprint sensor is integrated in a host device, such as a personal computer or cellphone.

U.S. Pat. No. 8,145,916 to Boshra et al. discloses a pre-match processor on a host device that performs most complex and processor intensive work. The pre-match processor provides intermediate results for validating the data from the host using template watermarking information.

U.S. Patent Application Publication No. 2004/0230810 to Hillhouse discloses a system for multiple biometric screening. More particularly, Hillhouse discloses a first feature set being derived from sample and enrollment biometric templates. The first feature set is used to determine which enrollment biometric template has the highest probability of matching the sample biometric template. A second feature set is then derived from the biometric sample template and the determined enrollment biometric template and used to perform a one-to-one match.

SUMMARY OF THE INVENTION

In view of the foregoing background, it is therefore an object of the present invention to provide an authentication device that more quickly performs a finger matching operation.

This and other objects, features, and advantages in accordance with the present invention are provided by an electronic device that includes a finger biometric sensor to sense a user's finger adjacent thereto. The electronic device may also include a memory for storing finger matching biometric data and a subset of finger matching biometric data. A processor may also be coupled to the finger biometric sensor to acquire finger matching biometric data from the finger biometric sensor, and perform a finger pre-matching between a subset of the acquired finger matching biometric data and the subset of stored finger matching biometric data and based upon context data to generate pre-match data. The processor may also perform a finger matching between the acquired finger biometric data and the stored finger matching biometric data based upon the pre-match data. Accordingly, the electronic device may perform a finger matching operation more quickly.

The context data may include a current device orientation, for example. The electronic device may include data associated with a last finger match. The data associated with the last match may comprise at least one of a last match index and a last device orientation, for example.

The context data may include at least one application being executed by the processor, for example. The subset of stored finger biometric data may include a plurality of pre-matching template metrics.

The electronic device may further include a housing and a user input device carried by the portable housing. The user input device may carry the finger biometric sensor, for example. The user input-device may be a finger-operated input device and the processor may perform the finger matching also based upon operation of the finger-operated user input device. The processor may perform a spoof detecting operation of the acquired finger matching biometric data from the finger biometric sensor, for example.

A method aspect is directed to a method of matching finger biometric data in electronic device that may include a finger biometric sensor to sense a user's finger adjacent thereto, a memory for storing the finger matching biometric data and a subset of finger matching biometric data, and a processor coupled to the finger biometric sensor. The method may include acquiring finger matching biometric data from the finger biometric sensor, and performing a finger pre-matching between a subset of the acquired finger matching biometric data and the subset of stored finger matching biometric data and based upon context data to generate pre-match data. The method may further include performing a finger matching between the acquired finger biometric data and the stored finger matching biometric data based upon the pre-match data.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
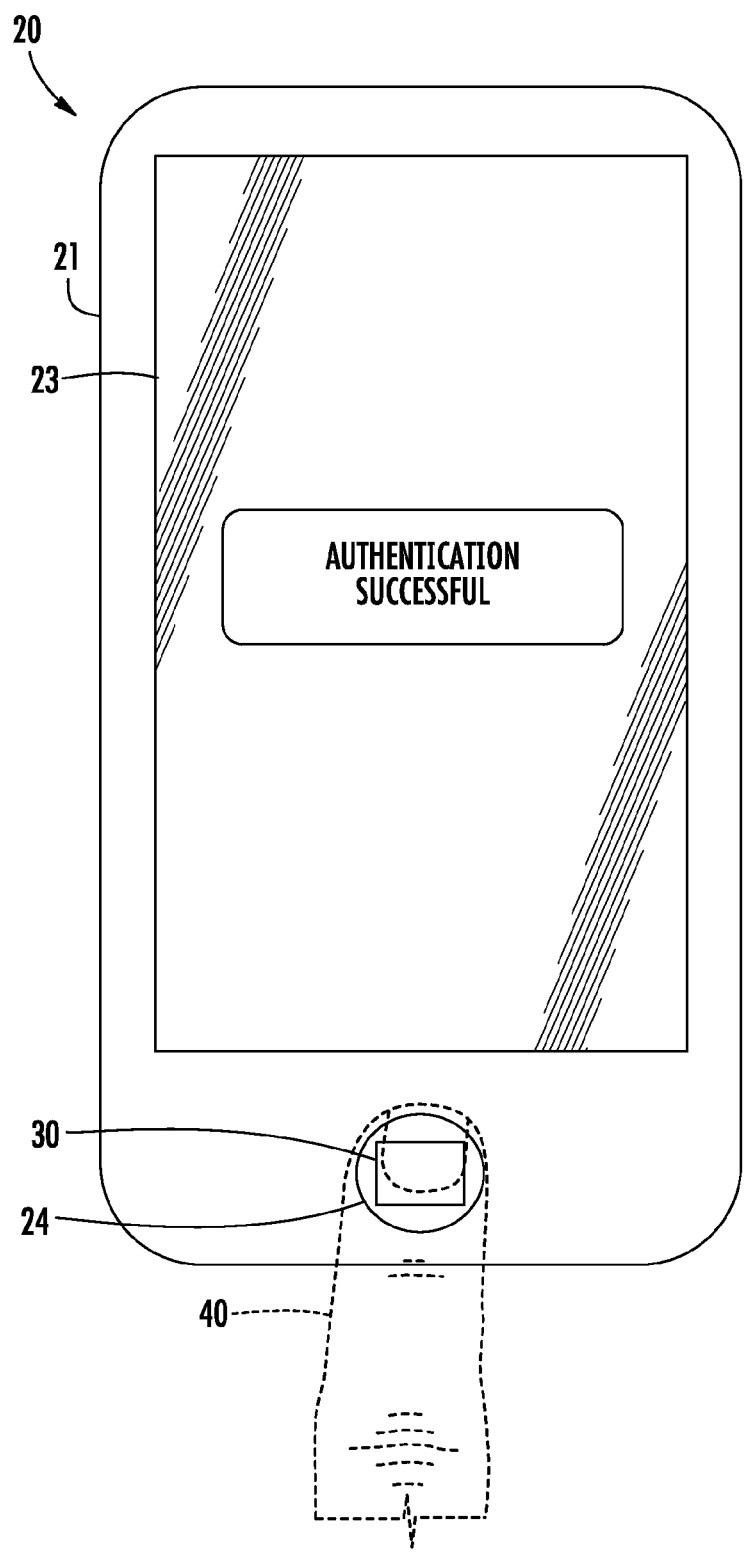
FIG. 1 is a plan view of an electronic device according to the present invention.
Figure 2:
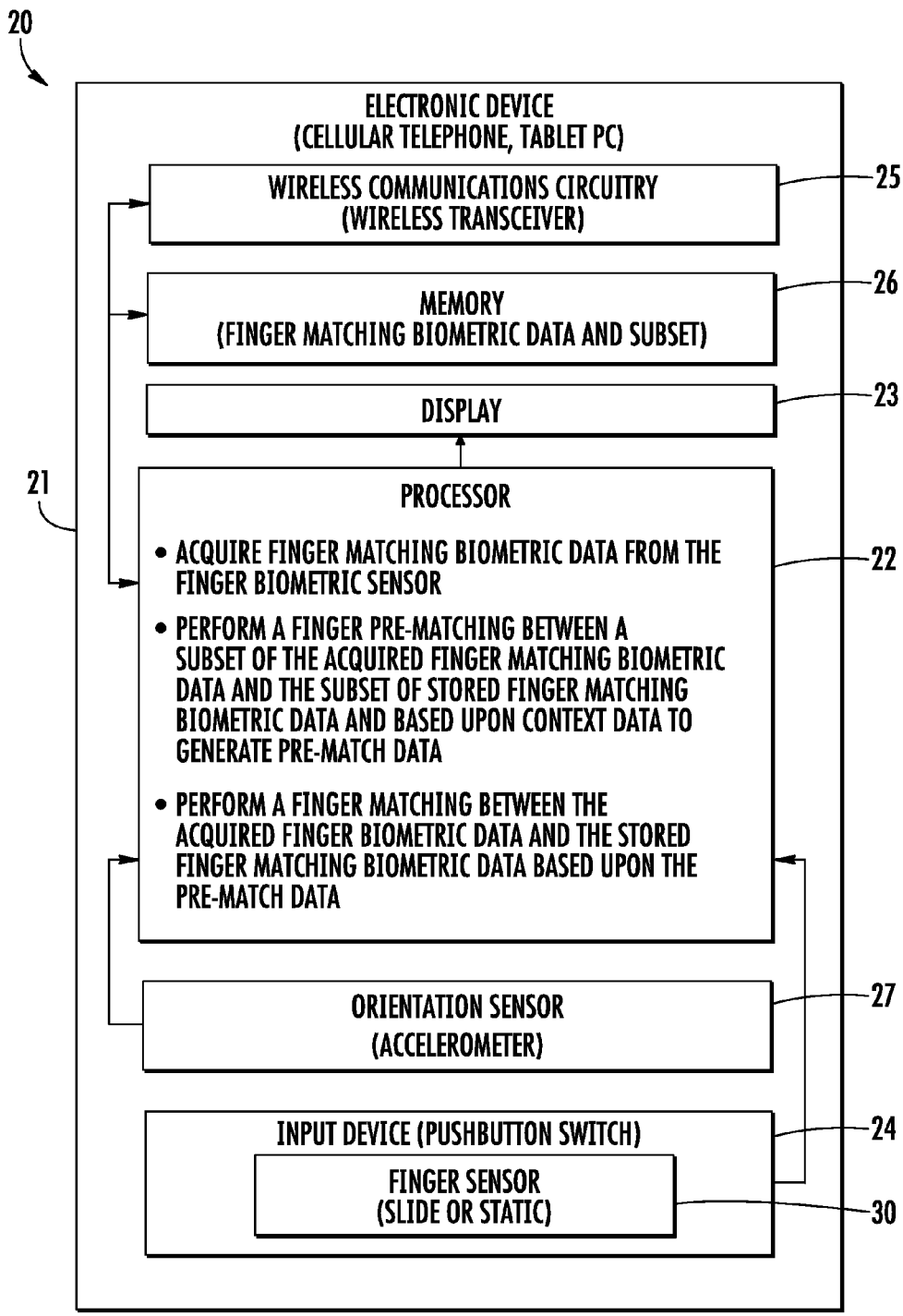
FIG. 2 is a schematic block diagram of the electronic device of FIG. 1.

Referring initially to FIGS. 1 and 2, an electronic device 20 is now described. The electronic device 20 illustratively includes a portable housing 21 and a processor 22 carried by the portable housing. The electronic device 20 is illustratively a mobile wireless communications device, for example, a cellular telephone. The electronic device 20 may be another type of electronic device, for example, a tablet computer, laptop computer, etc.

A wireless transceiver 25 is also carried within the housing 21 and coupled to the processor 22. The wireless transceiver 25 cooperates with the processor 22 to perform at least one wireless communications function, for example, for voice and/or data. In some embodiments, the electronic device 20 may not include a wireless transceiver 25 or other wireless communications circuitry.

A display 23 is also carried by the portable housing 21 and is coupled to the processor 22. The display 23 may be a liquid crystal display (LCD), for example, or may be another type of display, as will be appreciated by those skilled in the art. A memory 26 is also coupled to the processor 22. The memory 26 is for storing finger matching biometric data and a subset of the finger matching biometric data, as will be described in further detail below. An orientation sensor 27 is also coupled to the processor 22. The orientation sensor 27 may be an accelerometer, for example, for determining an orientation of the electronic device 20.

A finger-operated user input device 24, illustratively in the form of a pushbutton switch, is also carried by the portable housing 21 and is coupled to the processor 22. The pushbutton switch 24 cooperates with the processor 22 to perform a device function in response to the pushbutton switch. For example, a device function may include a powering on or off of the electronic device 20, initiating communication via the wireless communications circuitry 25, and/or performing a menu function.

More particularly, with respect to a menu function, the processor 22 may change the display 23 to show a menu of available applications based upon pressing of the pushbutton switch 24. In other words, the pushbutton switch 24 may be a home switch or button, or key. Of course, other device functions may be performed based upon the pushbutton switch 24, for example, switching to a user-interface unlocked mode. In some embodiments, the finger-operated user input device 24 may be a different type of finger-operated user input device, for example, forming part of a touch screen display. Other or additional finger-operated user input devices may be carried by the portable housing 21.

A finger biometric sensor 30 is carried by the pushbutton switch 24 to sense a user's finger 40 or an object placed adjacent the finger biometric sensor. The finger biometric sensor 30 is carried by the pushbutton switch 24 so that when a user contacts and/or presses downward on the pushbutton switch, data from the user's finger 40 is acquired, for example, for finger matching and/or spoof detection, as will be appreciated by those skilled in the art. In other words, the finger biometric sensor 30 may be responsive to static contact or placement of the user's finger 40 or object. Of course, in other embodiments, for example, where the finger biometric sensor 30 is not carried by a pushbutton switch, the finger biometric sensor may be a slide sensor and may be responsive to sliding contact, or the finger biometric sensor may be a standalone static placement sensor.

Figure 3:
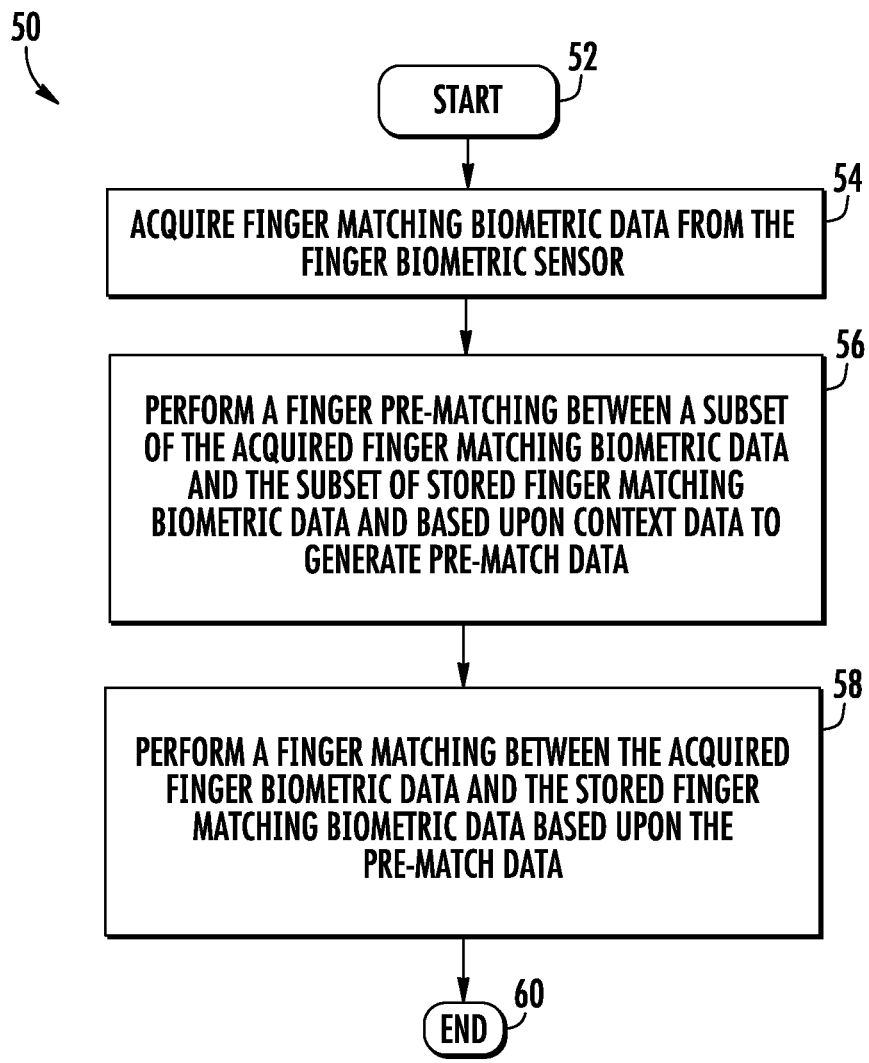
FIG. 3 is a flow chart of a method of matching finger biometric data according to the present invention.

Referring now additionally to the flowchart 50 in FIG. 3, operation of the electronic device 20 is now described. Beginning at Block 52 the processor 22 acquires finger matching biometric data from the finger biometric sensor 30 (Block 54). At Block 56 the processor 22 performs a finger pre-matching between a subset of the acquired finger matching biometric data and the subset of stored finger matching biometric data and based upon context data to generate pre-match data. The processor 22 performs a finger matching between the acquired finger biometric data and the stored finger matching biometric data based upon the pre-match data (Block 58). The method ends at Block 60.

Figure 4:
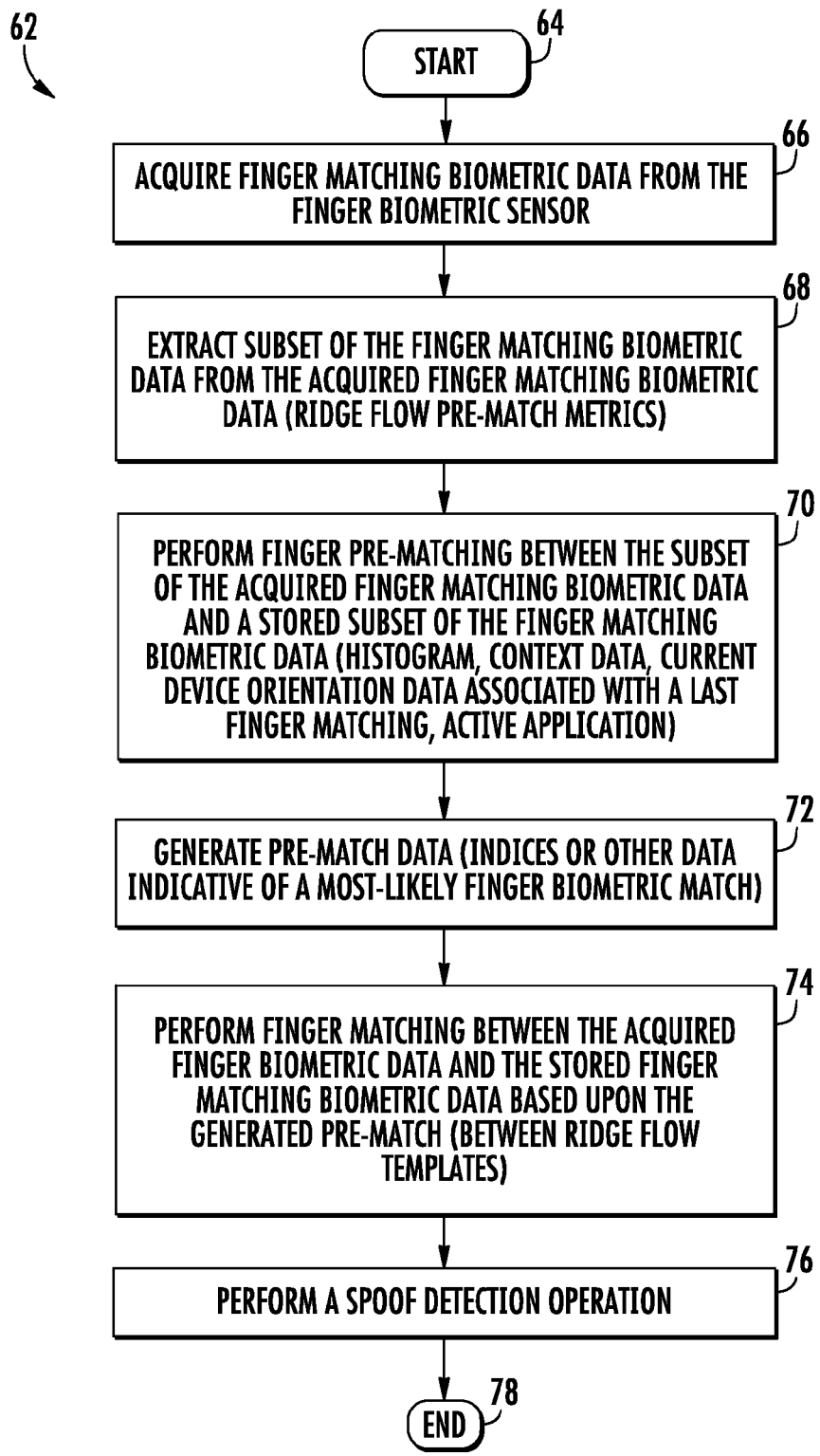
FIG. 4 is a more detailed flow chart of a method of matching finger biometric data according to the present invention.

Referring now to the flowchart 62 in FIG. 4, further details of the operation of the electronic device 20 are now described. Beginning at Block 64, the processor 22 cooperates with the finger biometric sensor 30 to acquire finger matching biometric data (Block 66). The acquired finger matching biometric data may include fingerprint data, and more particularly, fingerprint minutae data, ridge and/or valley fingerprint image data, ridge flow data, finger pore data, etc. For example, the finger biometric sensor 30 may be a finger sensor as described in U.S. Pat. No. 5,953,441 to Setlak and/or as described in U.S. Pat. No. 6,927,581 to Gozzini, and assigned to the assignee of the present invention and the entire contents of which are herein incorporated by reference. The processor 22, at Block 68, extracts a subset of the finger matching biometric data from the acquired finger matching biometric data. The subset of the acquired finger matching biometric data may include pre-match metrics, for example, ridge flow pre-match metrics. More particularly, the pre-match metrics calculated by the processor 22 may be a set of partial histograms. Of course, the subset of the acquired finger matching biometric data may include other data.

The processor 22 performs a finger pre-matching between the subset of the acquired finger matching biometric data and a stored subset of the finger matching biometric data (Block 70). In the case of the pre-match metrics including partial histograms, the processor 22 may perform the pre-matching based upon histogram matching. Advantageously, the histograms may be considered projections of the ridge flow data that may not allow for reconstruction of the ridge flow template. Thus confidentiality or security may thus be maintained.

The finger pre-matching (Block 70) is also performed based upon context data also stored in the memory 26. The context data may include current device orientation data, for example, from the orientation sensor 27. The context data may also include data associated with a last finger match. More particularly, the data associated with the last finger match may include an index of a last successful finger matching, and an orientation of the electronic device 20 during the last successful finger matching. The context data may also include data indicative of an active application being executed by the processor 22, for example. As will be appreciated by those skilled in the art, an active application, i.e., being executed by the processor, may be indicative of a current device orientation, a particular user, or other resources that may particularly useful for use in finger pre-matching. Of course, the context data may include other or additional data regarding the last successful match or data from the electronic device 20. Moreover, certain context data may be selectively used in certain circumstances, which may further increase speed. For example, if a particular application being executed involves the electronic device being in a specific orientation, a current orientation of the device may not be sensed, but instead be based upon the application.

As will be appreciated by those skilled in the art, the processor 22 performs the finger pre-matching on high-level template metrics. The high-level template metrics typically do not allow for reconstruction of the template or images.

At Block 72, the processor 22 generates pre-match data, which may include, for example, indices or other data indicative of a most-likely finger biometric match. In other words, the finger pre-matching generates data that is used to narrow a full finger biometric match to the most likely of matches. This may be particularly advantageous because it may reduce the overall processing time as compared to performing a full finger biometric match on an entire or full set of stored finger matching biometric data. Other or additional information, as will be appreciated by those skilled in the art, may also be generated based upon the pre-matching.

The processor 22 performs a finger matching between the acquired finger biometric data and the stored finger matching biometric data based upon the generated pre-match data (Block 74). More particularly, the processor 22 may extract a ridge flow template from the acquired finger biometric data and perform a match between pre-processed enrolled ridge flow templates stored in the memory 26. In some embodiments, the enrolled ridge flow templates may not be pre-processed by the processor 22. The pre-processing of the enrolled ridge flow templates may occur at any time prior to the match being performed, for example, during initialization of the electronic device 20 or finger biometric sensor 30.

The processor 22 performs a ridge flow 1-to-1 matching between the extracted ridge flow template and the pre-processed enrolled ridge flow data based upon the biometric most likely match data. Other metric data generated by the pre-match may be used by the processor 22 in the ridge flow 1-to-1 matching, and the processor may perform other types of matching using other types of finger matching biometric data, as will be appreciated by those skilled in the art.

As will be appreciated by those skilled in the art, by performing a finger pre-matching using, for example, the context information, the overall speed of the finger matching between the acquired finger biometric data and the stored biometric data may be increased. In other words, the speed of the ridge flow 1-to-1 matching may be increased. The processor 22 advantageously increases matching speeds by reducing the number of attempted finger matches, i.e., ridge flow matches at Block 74.

An increase in matching speed may be particularly desirable, for example, when other or additional functions are to be performed by the processor 22 at or near the same time as the finger matching, for example, when starting or running an application responsive to operation of the pushbutton switch 24. The speed of processing may become increasingly important, for example, if the application uses the finger biometric sensor 30. Moreover, additional processing, for example, for a desired level of security of the acquired finger biometric data may contribute to the overall processing time. Indeed, a relatively large delay in processing the finger matching biometric data or performing a match along with other operations may detrimentally affect the user's experience. For example, the user may have to wait while finger matching operation and application processing is performed.

Moreover, other or additional functions may be performed on the acquired finger matching biometric data. For example, the processor 22 may perform a spoof detection operation on the acquired finger biometric data (Block 76). The method ends at Block 78. More particularly, the processor 22 may acquire spoof detection data and determine whether the acquired spoof detection data is representative of a live finger. As will be appreciated by those skilled in the art, a live finger has certain biometric or other characteristics that allow differentiation with a spoof finger, and data representative of these characteristic may be used to determine whether a live finger has in fact been placed adjacent the finger biometric sensor 30, as will be explained in further detail below.

In one example spoof detection technique, the spoof detection data may include complex impedance data. The processor 22 may perform the spoof detection based upon acquired complex impedance data. As will be appreciated by those skilled in the art, a live finger has a complex impedance that can be distinguished from the complex impedance of a spoof finger. Further details of using complex impedance data for spoof detection are disclosed in U.S. Pat. No. 5,940,526 to Setlak, and assigned to the assignee of the present application, and the entire contents of which are herein incorporated by reference.

In another example spoof detection technique, the spoof detection data may include light polarization data. As will be appreciated by those skilled in the art, light reflected from a live finger versus a spoof finger has different properties or characteristics, for example, polarization. The processor 22 may perform the spoof detection based upon acquired light polarization data. Further details of using complex impedance data for spoof detection are disclosed in U.S. Pat. No. 8,180,120 to Hook, and assigned to the assignee of the present application, and the entire contents of which are herein incorporated by reference.

In yet another example spoof detection technique, the spoof detection data may include spatial alignment data. The processor 22 may perform the spoof detection based upon the acquired spatial alignment data. As will be appreciated by those skilled in the art, alignment data may differ from a live finger to a spoof finger, for example, when a finger or spoof finger moves across the biometric finger sensor 30. Further details of using spatial alignment data are described in U.S. Application Publication No. 2009/0316963 to Boshra, and assigned to the assignee of the present application, and the entire contents of which are herein incorporated by reference.

Of course, other ox additional spoof detection techniques may be used. Additionally, the processor 22 may perform a spoof detection operation prior to performing any matching or pre-matching operation. In some embodiments, the spoof detection operation may be performed in parallel with the matching operations, as will be appreciated by those skilled in the art.

Figure 5:
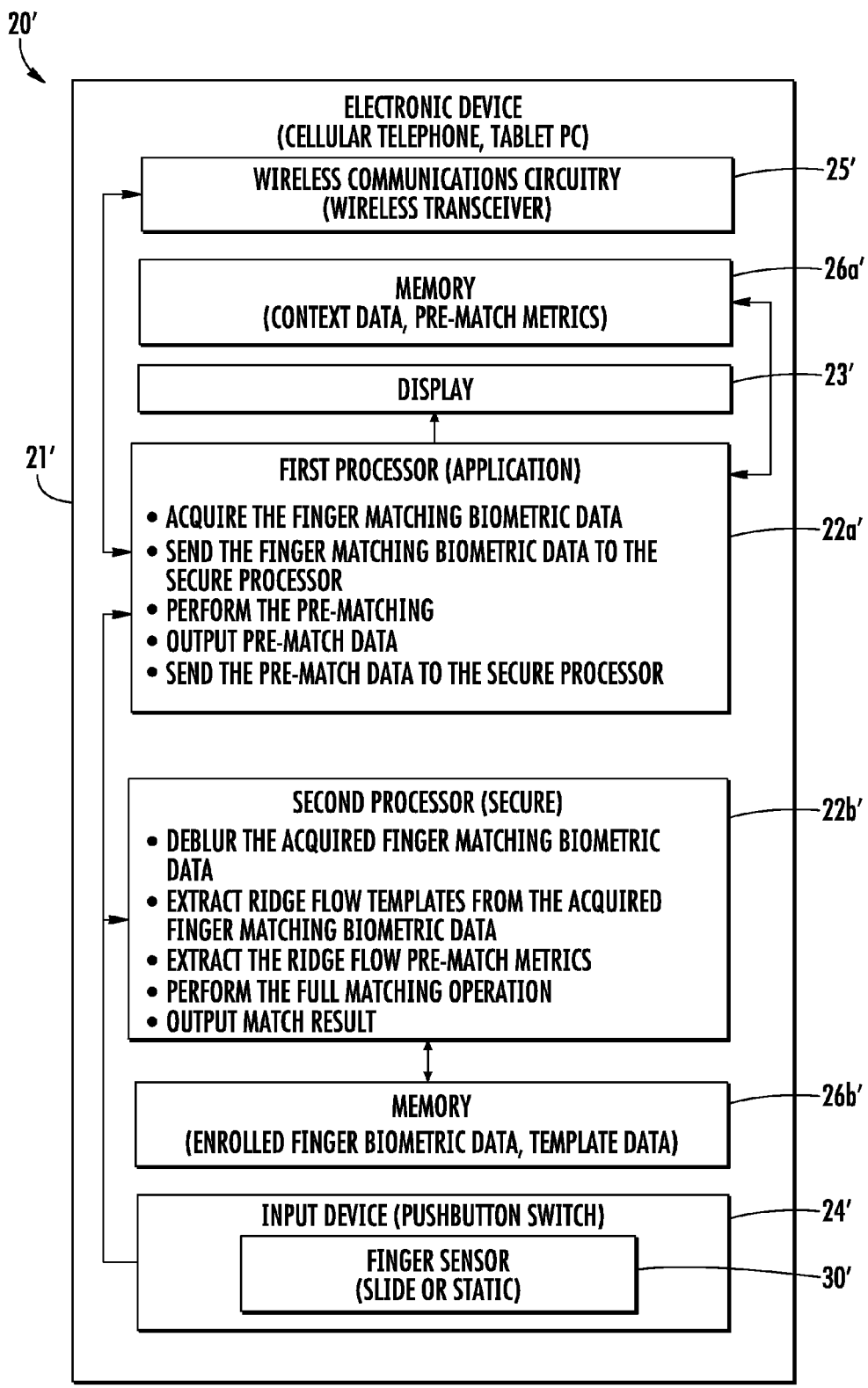
FIG. 5 is a schematic block diagram of an electronic device according another embodiment of the present invention.
Figure 6:
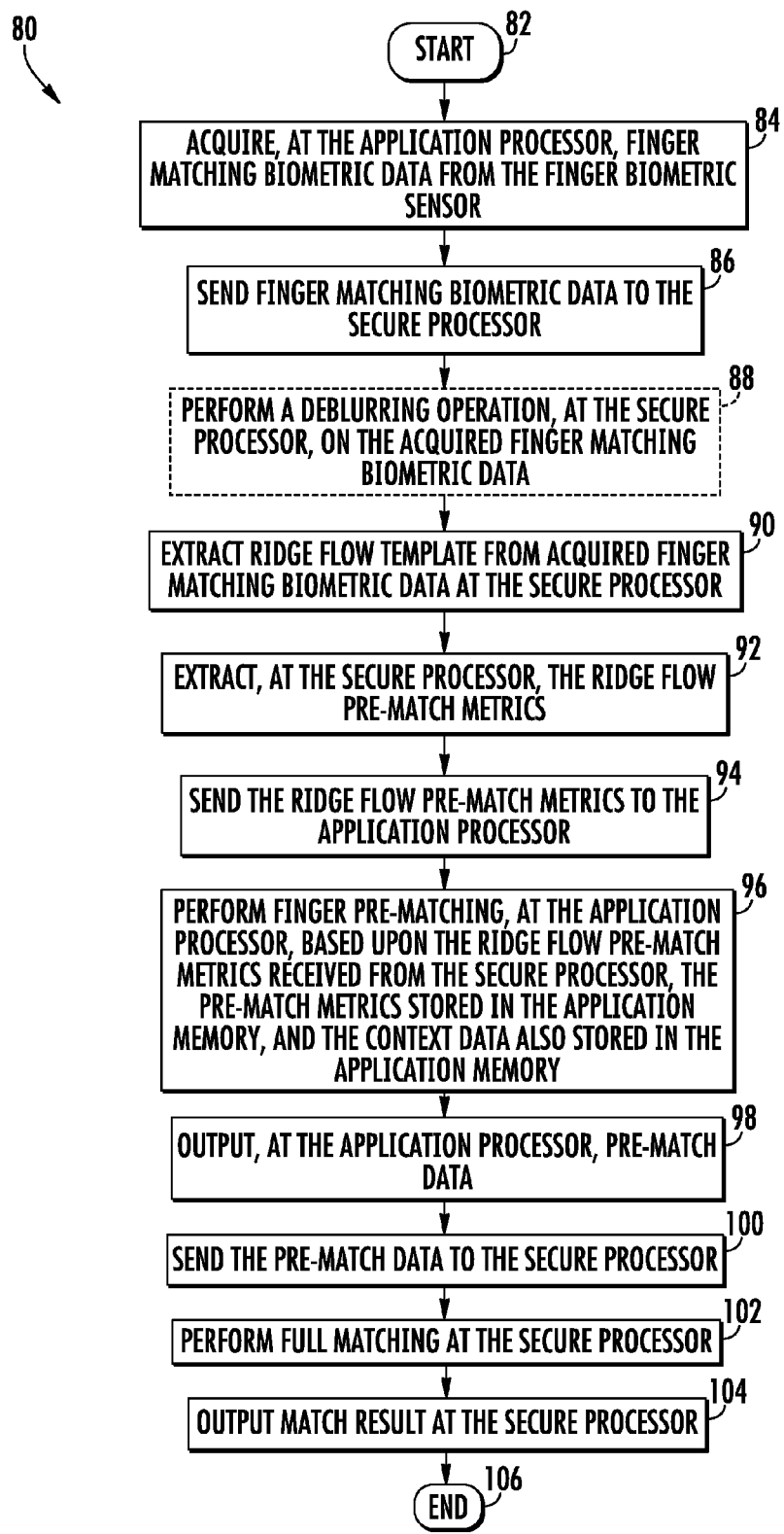
FIG. 6 is a flow chart of a method of matching finger matching biometric data for use with the device of FIG. 5.

Referring now to the schematic block diagram in FIG. 5, and with reference to the flowchart 80 in FIG. 6, in another embodiment, the electronic device 20' may include two (first and second) processors 22a', 22b'. For example, the first processor 22a' may be an application processor or processor for the electronic device 20'. The second processor 22b' may be secure processor and may be for processing finger biometric data. The application processor 22a' may have a corresponding application memory 26a', and the secure processor 22b' may also have a corresponding memory 26b'. The application memory 26a' may store the context data and stored pre-match metrics. The secure processor memory 26b' may store enrolled finger biometric data and template data, as will be appreciated by those skilled in the art.

Beginning at Block 82, the application processor 22a' acquires the finger matching biometric data (Block 84), which may be encrypted, and sends the finger matching biometric data to the secure processor 22b' (Block 86). The finger matching biometric data may be data representative of a finger image. The secure processor 22b' may optionally perform a deblurring operation on the acquired finger matching biometric data (Block 88). At Block 90, the ridge flow templates are extracted from the acquired finger matching biometric data by the secure processor 22b'. The extracted ridge flow templates are stored in the corresponding memory 26b'.

The secure processor 22b' also extracts the ridge flow pre-match metrics (Block 92), for example, as described above and sends the ridge flow pre-match metrics to the application processor 22a' (Block 94). The application processor 22a' performs the pre-matching at Block 96 based upon the ridge flow pre-match metrics received from the secure processor 22b', the pre-match metrics stored in the application memory 26a', and the context data also stored in the application memory. The application processor 22a' outputs pre-match data as a result of the pre-matching operation (Block 98) and sends the pre-match data to the secure processor 22b' for a full matching operation (Block 100).

At Block 102, the secure processor 22b' performs the full matching operation, i.e., a ridge flow 1-to-1 matching operation based upon the stored finger matching biometric data, (i.e., enrollment data/templates) and the received pre-match data. A match result may be output by the secure processor (Block 104). The method ends at Block 106. As will be appreciated by those skilled in the art, in some embodiments, the functionality of the application processor 22a' and the secure processor 22b' may be shared for increased speed. In other words, the full matching operation may be performed by both the application processor 22a' and the secure processor 22b', for example. This may be accomplished by partitioning of software or the computer executable instruction executed by the processors for performing the desired functions, for example, the full matching. Of course, other methods and techniques performing operations on both processors may be used. Moreover, more than two processors may be used.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
   a finger biometric sensor to sense a user's finger adjacent thereto;
   a memory for storing finger matching biometric data and a subset of finger matching biometric data; and
   a processor coupled to said finger biometric sensor to
      acquire finger matching biometric data from said finger biometric sensor,
      perform a finger pre-matching between a subset of the acquired finger matching biometric data and the subset of stored finger matching biometric data and based upon context data to generate pre-match data, the context data comprising at least one of a last match index and a last device orientation sensed from an orientation sensor to sense an orientation of the electronic device relative to a surface of Earth, and
      perform a finger matching between the acquired finger biometric data and the stored finger matching biometric data based upon the pre-match data.

2. The electronic device of claim 1, wherein the context data comprises a current device orientation.

3. The electronic device of claim 1, wherein the context data comprises at least one application being executed by said processor.

4. The electronic device of claim 1, wherein the subset of stored finger biometric data comprises a plurality of pre-matching template metrics.

5. The electronic device of claim 1, further comprising a housing and a user input device carried by said housing; and wherein said input device carries said finger biometric sensor.

6. The electronic device of claim 5, wherein said input device comprises a finger-operated input device; and wherein said processor performs the finger matching also based upon operation of said finger-operated user input device.

7. The electronic device of claim 1, wherein said processor is to acquire spoof detection data from said biometric sensor and perform a spoof detecting operation of the acquired spoof detection data.

8. The electronic device of claim 1, further comprising a wireless transceiver coupled to said processor.

9. An electronic device comprising:
   a housing;
   a finger biometric sensor carried by said housing and to sense a user's finger adjacent thereto;
   a memory for storing finger matching biometric data and a subset of finger matching biometric data;
   a wireless transceiver carried by said housing;
   a finger-operated user input device carried by said housing;

an orientation sensor to sense a device orientation relative to a surface of Earth; and a processor coupled to said wireless transceiver to perform at least wireless communications function and to said finger biometric sensor to, based upon operation of said finger-operated user input device acquire finger matching biometric data from said finger biometric sensor, perform a finger pre-matching between a subset of the acquired finger matching biometric data and the subset of stored finger matching biometric data and based upon context data to generate pre-match data, the context data comprising a last match index and a last device orientation sensed from the orientation sensor, and perform a finger matching between the acquired finger biometric data and the stored finger matching biometric data based upon the pre-match data.

10. The electronic device of claim 9, wherein the context data comprises a current device orientation.

11. The electronic device of claim 9, wherein the context data comprises at least one application being executed by said processor.

12. The electronic device of claim 9, wherein the subset of stored finger biometric data comprises a plurality of pre-matching template metrics.

13. A method of matching finger biometric data in electronic device comprising a finger biometric sensor to sense a user's finger adjacent thereto, a memory for storing the finger matching biometric data and a subset of finger matching biometric data, and a processor coupled to the finger biometric sensor, the method comprising:

acquiring finger matching biometric data from the finger biometric sensor;

performing a finger pre-matching between a subset of the acquired finger matching biometric data and the subset of stored finger matching biometric data and based upon context data to generate pre-match data, the context data comprising at least one of a last match index and a last device orientation sensed from an orientation sensor to sense an orientation of the electronic device relative to a surface of Earth; and performing a finger matching between the acquired finger biometric data and the stored finger matching biometric data based upon the pre-match data.

14. The method of claim 13, wherein the context data comprises a current device orientation.

15. The method of claim 13, wherein the context data comprises at least one application being executed by said processor.

16. The method of claim 13, wherein the subset of stored finger biometric data comprises a plurality of pre-matching template metrics.

17. The method of claim 13, wherein the finger matching is performed also based upon operation of a finger-operated user input device carrying the finger biometric sensor.

\* \* \* \* \*

UNITED STATES PATENT AND TRADEMARK OFFICE
CERTIFICATE OF CORRECTION

| | | |
|---|---|---|
| PATENT NO. | : 9,436,864 B2 | Page 1 of 1 |
| APPLICATION NO. | : 13/592616 | |
| DATED | : September 6, 2016 | |
| INVENTOR(S) | : Gozzini | |

It is certified that error appears in the above-identified patent and that said Letters Patent is hereby corrected as shown below:

In the Claims

Column 9, Line 4　　　　Delete: "at least wireless"
　　　　　　　　　　　　Insert: --at least one wireless--

Column 9, Lines 27-28　　Delete: "data in electronic"
　　　　　　　　　　　　Insert: --data in an electronic--

Signed and Sealed this
Twenty-fifth Day of October, 2016

Michelle K. Lee
*Director of the United States Patent and Trademark Office*